(12) United States Patent
Park et al.

(10) Patent No.: US 6,776,524 B2
(45) Date of Patent: Aug. 17, 2004

(54) RAKE THERMOCOUPLE

(75) Inventors: Sun Park, Woburn, MA (US); John V. Ginkus, Atkinson, NH (US)

(73) Assignee: Ametek, Inc., Paoli, PA (US)

( * ) Notice: Subject to any disclaimer, the term of this patent is extended or adjusted under 35 U.S.C. 154(b) by 0 days.

(21) Appl. No.: 09/969,092

(22) Filed: Oct. 2, 2001

(65) Prior Publication Data

US 2003/0063653 A1 Apr. 3, 2003

(51) Int. Cl.$^7$ .............................. G01K 7/02; G01K 1/08
(52) U.S. Cl. ...................... 374/179; 374/208; 374/148
(58) Field of Search ................................. 374/179, 208, 374/113, 148, 144; 136/230

(56) References Cited

U.S. PATENT DOCUMENTS

| | | | | | |
|---|---|---|---|---|---|
| 3,527,620 | A | * | 9/1970 | Meador ...................... | 136/201 |
| 4,201,968 | A | * | 5/1980 | Parisi et al. .................. | 338/28 |
| 4,338,174 | A | * | 7/1982 | Tamura ....................... | 204/408 |
| 4,572,677 | A | * | 2/1986 | Sehgal ........................ | 374/144 |
| 4,733,975 | A | * | 3/1988 | Komanetsky et al. ........ | 374/144 |
| 4,778,281 | A | * | 10/1988 | Falk ............................ | 374/140 |
| 5,185,996 | A | * | 2/1993 | Smith et al. .................. | 60/772 |
| 5,229,065 | A | * | 7/1993 | Bourgeon et al. ........... | 376/247 |
| 5,242,226 | A | * | 9/1993 | Ross et al. ................... | 374/208 |
| 5,740,197 | A | * | 4/1998 | Taggart et al. .............. | 374/148 |
| 5,812,588 | A | | 9/1998 | Deak et al. .................. | 374/166 |
| 6,485,175 | B1 | * | 11/2002 | Nimberger et al. ......... | 374/142 |

* cited by examiner

Primary Examiner—Diego Gutierrez
Assistant Examiner—Mirellys Jagan
(74) Attorney, Agent, or Firm—Hayes Soloway P.C.

(57) ABSTRACT

A thermocouple probe assembly is provided that includes at least one ball bushing placed along the length of the assembly to dampen vibrations and thereby reduce mechanical stress on the assembly. A rake thermocouple is provided that includes a plurality of probe tubes arranged parallel to one another, and each probe assembly is placed into an individual probe tube. Each probe tube has a window defined therein, and an air inlet port extending from the window generally perpendicular to the probe tube. The rake also includes a mated end cap and cup bushing with a defined gap between the inside diameter of the cup bushing and the outside diameter of the end cap to further dampen mechanical stress on the rake.

16 Claims, 5 Drawing Sheets

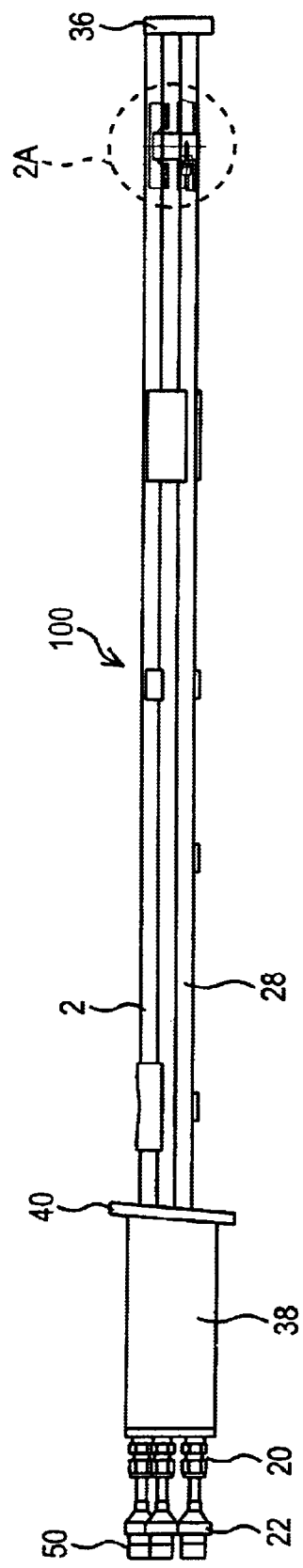
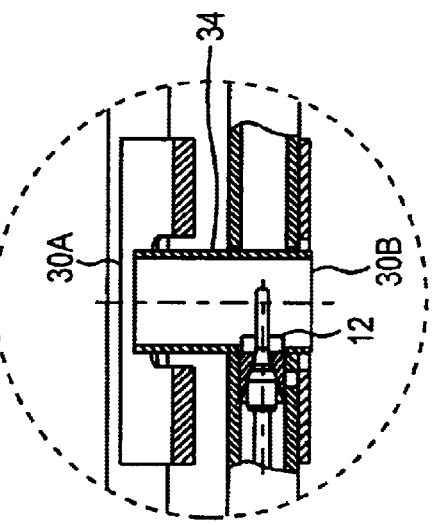
FIG. 2
FIG. 2A

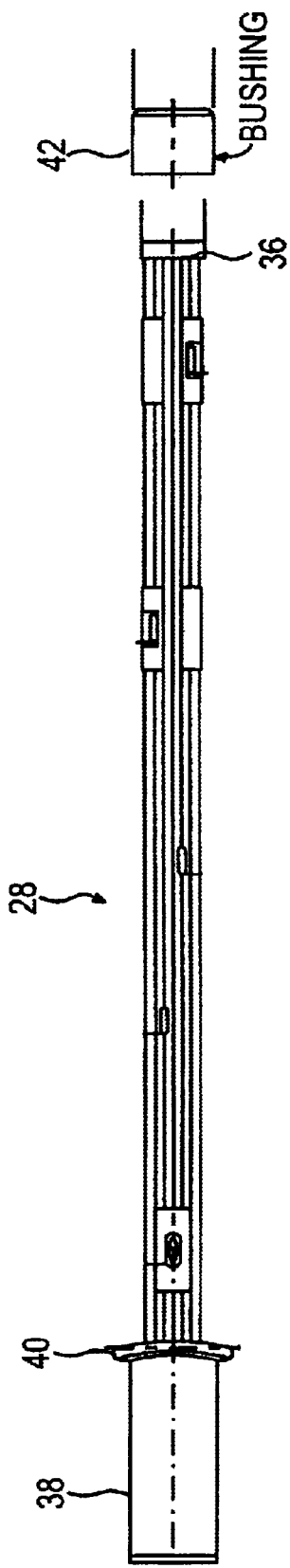

RAKE THERMOCOUPLE

BACKGROUND OF THE INVENTION

1. Field of the Invention

The present invention relates to temperature measurement technology, and more specifically, to a multi-element rake thermocouple. Particular utility for the present invention is found in temperature measurement in turbine engines.

2. Description of Related Art

Rake thermocouple devices are known in the art, and are generally provided as temperature measurement mechanisms for high temperature and/or high air flow environments such as turbine engines. As a general matter, rake thermocouple devices include a plurality of thermocouples arranged at different distances along the length of the rake, and exposed to the airflow in a turbine engine to measure temperature. One such thermocouple is provided in U.S. Pat. No. 5,812,588, issued to Deak et al. The '588 patent discloses a temperature probe that includes an outer probe tube projecting into the hot-gas region of the waste-gas diffusor, and the probe tube is provided with an inner bore running in the direction of the tube axis of the probe tube. The probe tube includes a number of throughflow ducts over its length running transversely relative to the tube axis and in which are located a number of thermocouples arranged in the throughflow ducts. The thermocouples are connected to a compensating line in a terminal box. Each thermocouple is arranged in a solely heat-movably guided manner in a protective tube which is fixed relative to the inner bore of the probe tube.

One disadvantage of this design is that in order to replace a single defective thermocouple, all the thermocouple units must be removed and replaced. Also, the '588 patent does not provide any mechanism to dampen stress vibrations that occur in turbine environments.

SUMMARY OF THE INVENTION

Accordingly the present invention provides a thermocouple probe assembly that includes ball bushings placed along the length of the assembly to dampen vibrations and thereby reduce mechanical stress on the assembly. A rake thermocouple is provided that includes a plurality of probe tubes arranged parallel to one another, and each probe assembly is placed into an individual probe tube. Each probe tube has a window defined therein, and an air inlet port extending from the window generally perpendicular to the probe tube. The rake also includes a mated end cap and cup bushing having a defined gap between the inside diameter of the cup bushing and the outside diameter of the end cap to further dampen mechanical stress on the rake.

In one aspect, the present invention provides a thermocouple probe assembly that includes a thermocouple tip section comprising a thermocouple junction coupled to a tapered bushing, a ball bushing, and a connecting cable connecting the ball bushing to the thermocouple tip section.

The present invention also provides a thermocouple probe assembly, comprising a thermocouple junction coupled to a ball bushing. The ball bushing is coupled to the thermocouple junction at a predetermined distance from the thermocouple junction. The predetermined distance is chosen to dampen vibration of the thermocouple probe assembly.

In yet another aspect, the present invention provides a thermocouple probe tube, comprising a tubular member having an inside diameter and a long axis; a window formed within the tubular member formed generally perpendicular to the long axis; and an air inlet port extending from the window in at least one direction.

In still another aspect, the present invention provides a rake thermocouple, comprising at least one thermocouple probe assembly comprising a thermocouple junction coupled to a ball bushing; and at least one thermocouple probe tube housing said thermocouple probe, said at least one thermocouple probe tube comprising a tubular member having an inside diameter and a long axis; a window formed within the tubular member formed generally perpendicular to the long axis; and an air inlet port extending from the window in at least one direction.

It will be appreciated by those skilled in the art that although the following Detailed Description will proceed with reference being made to preferred embodiments, the present invention is not intended to be limited to these preferred embodiments. Other features and advantages of the present invention will become apparent as the following Detailed Description proceeds, and upon reference to the Drawings, wherein like numerals depict like parts, and wherein:

BRIEF DESCRIPTION OF THE DRAWINGS

FIG. 2 is side view of an exemplary rake for housing a plurality of thermocouple probe assemblies of the present invention;

FIG. 2A is an exploded view of a probe tip section of the thermocouple probe assembly of FIG. 1 positioned in an airflow window of the probe tube;

FIG. 5 depicts another assembled side view of the exemplary rake thermocouple of the present invention.

DETAILED DESCRIPTION OF EXEMPLARY EMBODIMENTS

Figure 1:
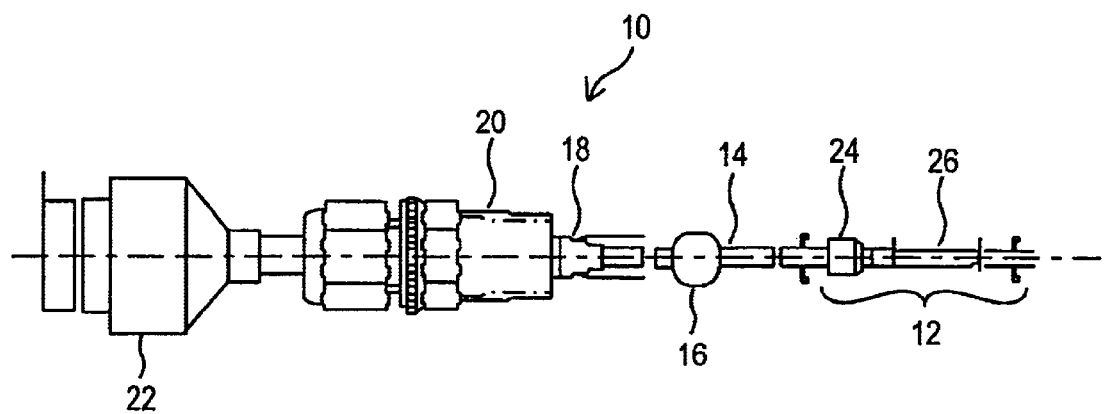
FIG. 1 depicts a side view of an exemplary thermocouple probe assembly of the present invention.

FIG. 1 depicts a thermocouple probe assembly 10 according to one exemplary embodiment of the present invention. The thermocouple probe assembly of this exemplary embodiment comprises a thermocouple probe tip portion 12 that includes a thermocouple junction 26 coupled to a tapered bushing 24. Each thermocouple probe tip 12 is attached to a ball bushing 16 via a cable segment 14, which is connected to a backshell 22 via an over sheath sleeve 18. As will be described below, tapered bushing 24 is used to secure thermocouple probe 10 into the rake. The backshell 22 includes mated connectors (for conductors of the thermocouple) that connect to a high temperature connector 50. These features will be described in greater detail below.

Figure 1A:
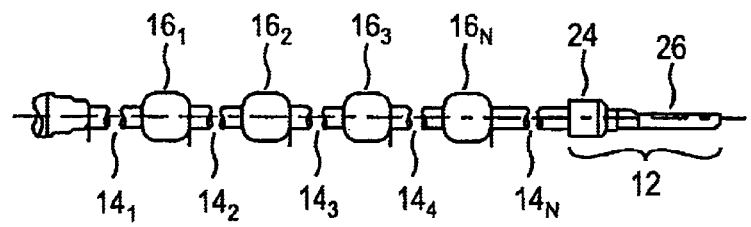
FIG. 1A depicts a detailed view of the probe of the exemplary thermocouple probe assembly of FIG. 1.

Referring now to FIG. 1A, the details of each thermocouple probe assembly 10 are provided. Ball bushings $16_1 \ldots 16_n$ are placed between the sleeve 18 and the thermocouple probe tip 12. Likewise, connecting each ball bushing $16_1 \ldots 16_n$ is a length of mineral insulated cable $14_1 \ldots 14_n$, which is used to connect the ball bushing 16 to the sleeve 18, and the ball bushing 16 to the thermocouple 12. The ball bushing 16 protects the probes from wear and reduces deflections by restricting its movement during vibration. In the exemplary embodiment, the ball bushings are placed along the length between the sleeve 18 and the thermocouple 12 at peak mechanical resonance points, but it is equally contemplated herein that other points along the length of the probe tube can be chosen in accordance with the exemplary embodiment of the present invention. For example, near peak resonant points, or off-peak resonant points may be chosen to provide sufficient mechanical damping, depending on the materials chosen and the desired sensitivity. Thus, the present invention is intended to broadly cover the use of ball bushing (or equivalents thereof) placed anywhere along the length of the thermocouple probe assembly. In the exemplary embodiment, the cable $14_1 \ldots 14_n$ is formed of mineral insulated cable which has sufficient flexibility to resist breakage when the entire thermocouple is fixed at either end but stiff enough to allow the probe to be inserted into the probe tube.

FIG. 2 depicts the rake thermocouple 100 of the exemplary embodiment. The rake thermocouple assembly includes a plurality of thermocouple probe assemblies 10 disposed within probe tubes 28. The probe tubes 28 are arranged generally parallel to one another and are comprised of a tubular member having an inside diameter to receive the probes, connected on either end to an outer housing 38 (that includes a flange portion 40) and an end cap 36. Since each thermocouple probe assembly 10 is independent of the others in the rake, the present invention improves cost and efficiency by permitting individual probe assemblies to be removed/repaired instead of having to remove all the probe assemblies. FIG. 2A is an exploded view of one probe tip section 12 positioned in a window 30 of the probe tube 28, as will be described below.

Figure 3:
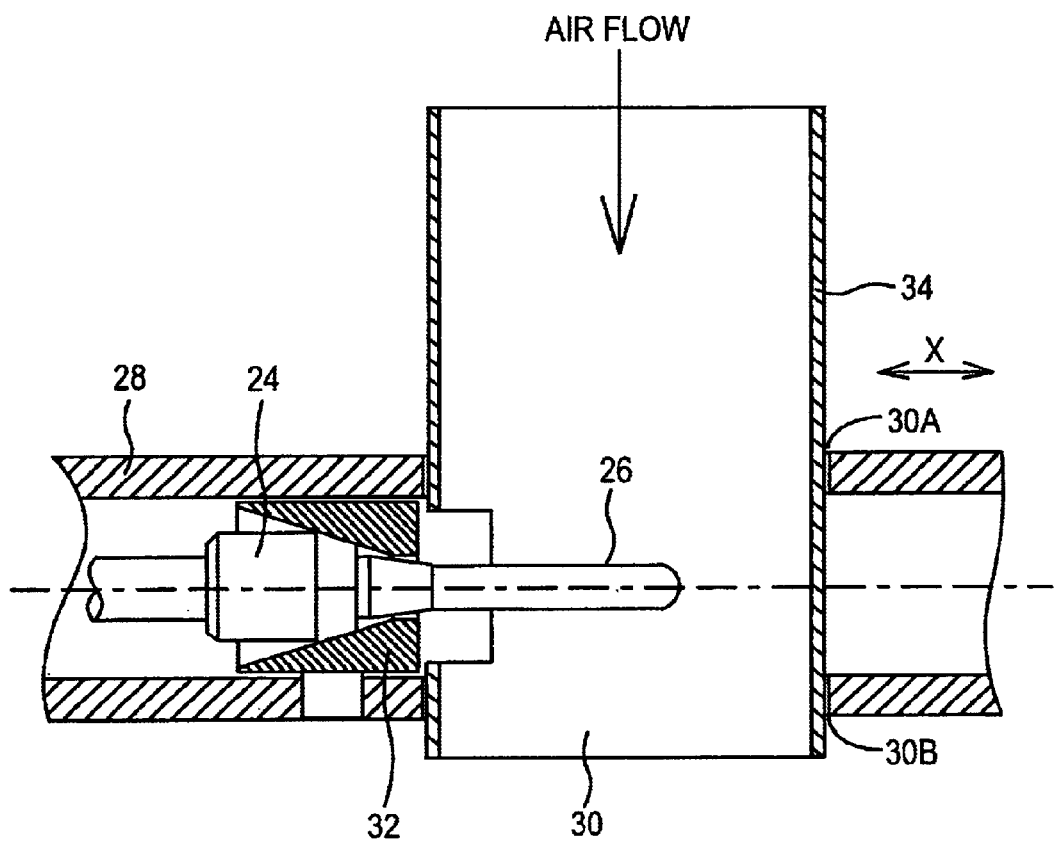
FIG. 3 is a cross-sectional view of a probe tip section of the thermocouple probe assembly of FIG. 1 positioned in an airflow window of the probe tube.

FIG. 3 depicts a detailed view of the probe tip section of the thermocouple probe positioned in a window defined in the exemplary probe tube 28. In the exemplary embodiment, each individual thermocouple probe assembly is inserted such that the tapered bushing 24 mates against a tapered stop 32 formed within the probe tube. Bushing 24 and stop 32, when mated together, form a stop mechanism that secures each thermocouple probe assembly to the rake thermocouple. The stop mechanism is provided in the exemplary embodiment to allow each thermocouple probe assembly to be independent from other probe assemblies. Securing both ends of the probe assembly with the fitting 20 and tapered bushing 24 is preferable (but not necessary) to yield better dampening and better longevity in high vibration environments observed in the gas turbines. Tapered surfaces are used in the stop mechanism to allow easy disengagement during transient thermal growth. This minimizes thermal stress due to thermal expansion. FIG. 3 is depicted in cross-section, and will be understood that the stop 32 is an annular ring member formed within the probe tube 28. The probe tube 28 includes a window 30 (or opening) that permits air to flow across the thermocouple 26. The window 30 is defined within the probe tube such that an air inlet portion of the window 30A and an air egress portion of the window 30B are generally aligned and are generally perpendicular to the long axis (X-axis) of the probe tube and generally parallel to the air flow. As will be described in detail below, port 34 is provided in the window 30 to provide more efficient airflow across the thermocouple 26.

Figure 4:
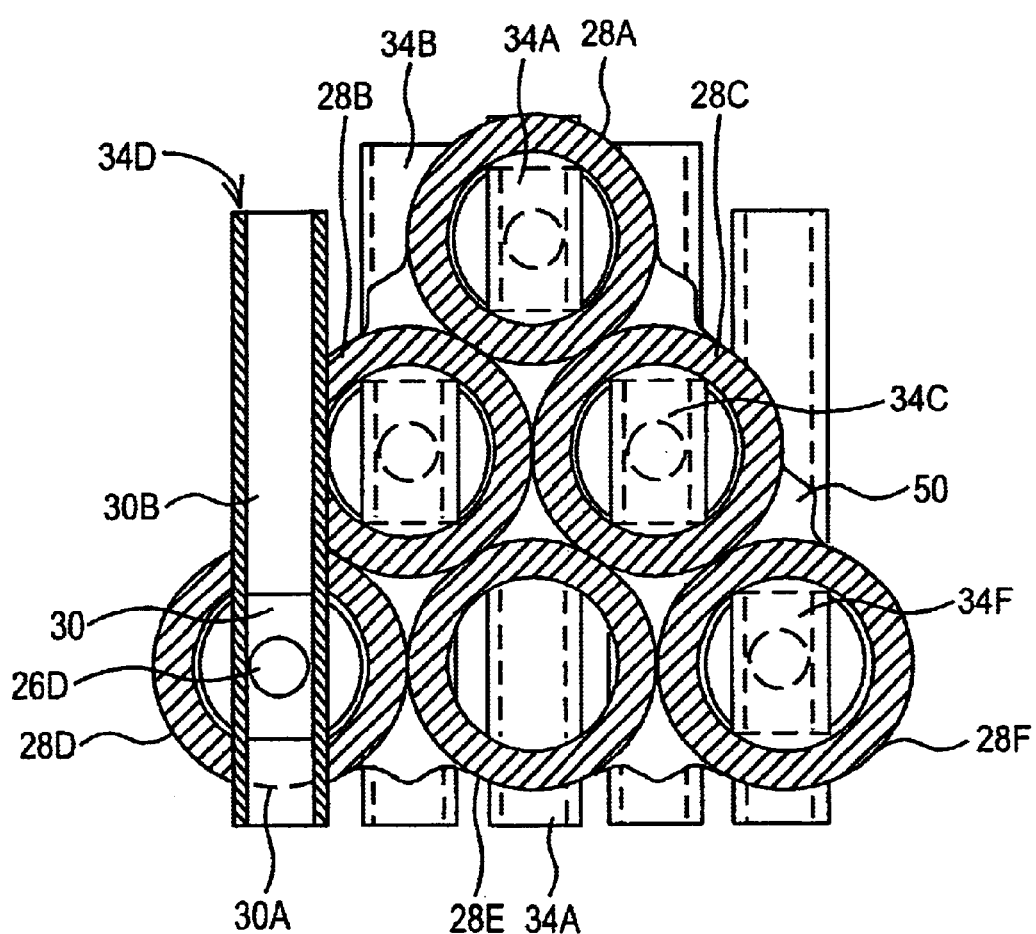
FIG. 4 depicts a detailed view of an exemplary probe tube and thermocouple probe assembly of the present invention.

FIG. 4 depicts a cross-sectional view of the rake thermocouple of FIG. 2. In this example, the probe tubes 28A through 28F are positioned in a stacked triangular arrangement as shown. This arrangement allows each independent thermocouple probe assembly exposure to the flow of air while reducing the cross-sectional diameter of the rake. Other arrangements can be provided without departing from the scope of the present invention, and the present invention is not intended to be limited to this arrangement as those skilled in the art will recognize that the present invention is not limited to the number of probe tubes used. Probe tube 28E, in this configuration, is provided for support, and does not include a thermocouple probe assembly, window or air inlet port (but, of course, may be so provided). Weld spots 50 are provided at locations along the length of the rake to hold the individual probe tubes together. In the exemplary embodiment, extending from each window 30 of each probe tube is a port 34A–34D and 34F. Ports 34A, 34B, 34C, 34D and 34F are hatched since they are positioned at different lengths along the length of the rake thermocouple in FIG. 3. Accordingly, taking the inlet port 34D as an example, the inlet port essentially comprises an extension to the window 30 that is formed generally perpendicular to the long axis of the probe tube. The inlet ports are added to each window so that similar dynamic temperatures are observed across each probe of the thermocouple. Generally perpendicular, as defined herein, may vary widely (+/−45 degrees), depending on application parameters, desired air flow, operating conditions, etc. The inlet ports generally provide an equal pressure drop across all the probe tubes by insuring that air flow within each probe tube has a similar velocity and therefore similar dynamic temperature. Each probe measures the total temperature, which is a measure of the dynamic temperature ($T_{dynamic}$) and the static temperature ($T_{static}$). By providing inlet ports for each thermocouple window, the present invention provides a more accurate temperature measurement than conventional means since a similar dynamic temperature is observed across all the thermocouples. Note that the length of each inlet port depicted in FIG. 4 need not be exactly equal. Indeed, in the exemplary embodiment of FIG. 4, the three different lengths shown in the figure reflect the hole size in turbine casings. While this will cause some pressure change between the lengths of inlet ports, the pressure change between shorter and longer ports may only vary 10 to 20%, which is sufficiently accurate for most applications, but may be adjusted as desired for given tolerance parameters.

FIG. 5 depicts the rake thermocouple 100 of the present invention that includes the housing 38 disposed on one end of the rake, and end cap 36 disposed on the other end of the rake, and a cup bushing 42. The end cap is disposed on one of said probe tube and the cup bushing is affixed to an external member (e.g., turbine wall) and adapted to receive the end cap thereby holding the rake. In most applications the rake is fixed to the turbine walls via the flange 40 and cup bushing 42. In the exemplary embodiment, the outside diameter of the end cap 36 and the inside diameter of the cup bushing 42 are formed to define a gap between them. The dimensions of the gap between the outside diameter of the end cap and the inside diameter of the bushing is chosen in accordance with, for example, the overall thickness of the rake thermocouple, expected minimum and maximum air flow velocities, temperature, vibration, and/or other consideration, and is generally provided to allow movement between the rake thermocouple and the bushing to flatten the amplitude of resonance by introducing non-linearity at resonance vibration. In this manner, the stress on the unit is thereby reduced. The actual dimension of the aforementioned gap is determined by the factors set forth above, and the present invention is intended to broadly cover a range of such gaps, depending on the physical dimensions of the rake and the particular operating environment.

Thus, there has been provided a thermocouple probe assembly, a probe tube and rake that provide increased mechanical dampening, permit removal of each individual thermocouple probe assemblies, and provide and more accurate temperature measurement, as is detailed above. Those skilled in the art will recognize numerous modifications to the present invention, and all such modifications are deemed within the scope of the present invention, only as limited by the claims.

What is claimed is:

1. A thermocouple probe assembly, comprising a thermocouple junction coupled to a ball bushing, wherein said ball bushing is coupled to said thermocouple junction at a predetermined distance from said thermocouple junction, said predetermined distance being chosen to dampen vibration of said thermocouple probe assembly.

2. A thermocouple probe assembly as claimed in claim 1, further comprising a backshell section connected to said ball bushing, and a connector coupled to said backshell section, said backshell section comprising mated connectors for conductors of said thermocouple junction which connect to the connector.

3. A thermocouple probe assembly as claimed in claim 1, wherein said predetermined distance comprises a peak mechanical resonance point.

4. A thermocouple probe assembly, comprising:
a thermocouple tip section comprising a thermocouple junction coupled to a tapered bushing;
a ball bushing; and
a connecting cable connecting said ball bushing with said thermocouple tip section;
wherein said ball bushing is coupled at a predetermined distance from said thermocouple tip section, said predetermined distance being chosen to dampen vibration of said thermocouple probe assembly.

5. A thermocouple probe assembly as claimed in claim 4, wherein said predetermined distance comprises a peak mechanical resonance point.

6. A rake thermocouple, comprising:
at least one thermocouple probe assembly comprising a thermocouple junction coupled to a ball bushing; and
at least one thermocouple probe tube housing said thermocouple probe, said at least one thermocouple probe assembly tube comprising a tubular member having an inside diameter and a long axis; a window formed within said tubular member formed generally perpendicular to said long axis; and an air inlet port extending from said window in at least one direction;
wherein said ball bushing is coupled at a predetermined distance from said thermocouple junction, said predetermined distance being chosen to dampen vibration of said thermocouple probe assembly.

7. A rake thermocouple, comprising:
at least one thermocouple probe assembly comprising a thermocouple junction coupled to a ball bushing; and
at least one thermocouple probe tube housing said thermocouple probe assembly said at least one thermocouple probe tube comprising a tubular member having an inside diameter and a long axis; a window formed within said tubular member formed generally perpendicular to said long axis; and an air inlet port extending from said window in at least one direction;
wherein said ball bushing is coupled at a predetermined distance from said thermocouple junction, said predetermined distance being chosen to dampen vibration of said thermocouple probe assembly; and
wherein said predetermined distance comprises a peak mechanical resonance point.

8. A rake thermocouple, comprising:
at least one thermocouple probe assembly comprising a thermocouple junction coupled to a ball bushing; and
at least one thermocouple probe tube housing said thermocouple probe assembly said at least one thermocouple probe tube comprising a tubular member having an inside diameter and a long axis; a window formed within said tubular member formed generally perpendicular to said long axis; and an air inlet port extending from said window in at least one direction; and
further comprising an end cap disposed on one end of said probe tube, and a mated cup bushing, said cup bushing being affixed to an external member and adapted to receive said end cap thereby holding said probe tube.

9. A rake thermocouple, comprising:
at least one thermocouple probe assembly comprising a thermocouple junction coupled to a ball bushing; and
at least one thermocouple probe tube housing said thermocouple probe assembly said at least one thermocouple probe tube comprising a tubular member having an inside diameter and a long axis; a window formed within said tubular member formed generally perpendicular to said long axis; and an air inlet port extending from said window in at least one direction; and
further comprising an end cap disposed on one end of said probe tube and a mated cup bushing, said cup bushing being affixed to an external member and adapted to receive said end cap thereby holding said probe tube;
wherein the outside diameter of the end cap and the inside diameter of the bushing are chosen to provide a gap between them.

10. A rake thermocouple, comprising:
at least one thermocouple probe assembly comprising a thermocouple tip having a thermocouple junction near a distalmost end of the tip, and a ball bushing coupled to the thermocouple junction; and
at least one thermocouple probe tube housing said thermocouple probe assembly, said at least one thermocouple probe tube comprising a tubular member having an inside diameter, a long axis, and an aperture formed therein for receiving said thermocouple tip; at least one pair of windows formed within said tubular member, said pair of windows formed opposite one another and generally perpendicular to said long axis; and an air inlet port extending from both said windows of said pair of windows in generally opposing directions, said air inlet port positioned generally parallel to a direction of airflow flowing through said air inlet port and extending from said windows in a direction generally perpendicular to said long axis;
wherein said aperture for receiving said thermocouple tip is disposed such that the distalmost end of said thermocouple tip received therein lies directly between said windows; and
wherein said air inlet port directs said airflow across the distalmost end of said thermocouple tip.

11. A rake thermocouple as claimed in claim 10, said thermocouple probe assembly further comprising a backshell section connected to said ball bushing, and a connector coupled to said backshell section, said backshell section comprising mated connectors for conductors of said thermocouple junction which connect to the connector.

12. A rake thermocouple as claimed in claim 10, wherein each said thermocouple junction is placed in said window and said air inlet port, thereby exposing said thermocouple junction to airflow.

13. A rake thermocouple as claimed in claim 10, wherein each said thermocouple probe assembly is removably disposed within said probe tube, respectively.

14. A rake thermocouple as claimed in claim 10, said thermocouple probe assembly further comprising a tapered bushing coupled to said thermocouple junction.

15. A rake thermcouple as claimed in claim 14, said probe tube further comprising a tapered stop bushing mated to said tapered bushing, said tapered stop bushing being positioned in said probe tube so that, when said tapered bushing is mated to said stop, said thermocouple is positioned in said air inlet port.

16. A thermocouple probe tube, comprising:
- a tubular member having a long axis, an inside diameter, and an aperture formed therein for receiving a thermocouple probe tip having a distalmost end;
- at least one pair of windows formed within said tubular member, said pair of windows formed opposite one another and generally perpendicular to said long axis; and
- an air inlet port extending from both said windows of said pair of windows in generally opposing directions, said air inlet port positioned generally parallel to a direction of airflow flowing through said air inlet port and extending from said windows in a direction generally perpendicular to said long axis,
- wherein said aperture for receiving said thermocouple probe tip is disposed such that the distalmost end of said thermocouple probe tip received therein lies directly between said windows; and
- wherein said air inlet port directs said airflow across the distalmost end of said thermocouple probe tip.

* * * * *